United States Patent
Savry et al.

(10) Patent No.: US 11,651,086 B2
(45) Date of Patent: May 16, 2023

(54) METHOD FOR EXECUTING A COMPUTER PROGRAM BY MEANS OF AN ELECTRONIC APPARATUS

(71) Applicant: Commissariat a l'Energie Atomique et aux Energies Alternatives, Paris (FR)

(72) Inventors: Olivier Savry, Grenoble (FR); Thomas Hiscock, Grenoble (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 146 days.

(21) Appl. No.: 17/109,424

(22) Filed: Dec. 2, 2020

(65) Prior Publication Data
US 2021/0173946 A1   Jun. 10, 2021

(30) Foreign Application Priority Data
Dec. 4, 2019   (FR) ...................... 19 13764

(51) Int. Cl.
*G06F 21/60* (2013.01)
*G06F 12/14* (2006.01)
(Continued)

(52) U.S. Cl.
CPC ........ *G06F 21/602* (2013.01); *G06F 12/1408* (2013.01); *G06F 21/31* (2013.01); *G06F 21/79* (2013.01)

(58) Field of Classification Search
CPC .... G06F 21/602; G06F 12/1408; G06F 21/31; G06F 21/79; G06F 21/64; G06F 21/78; G09C 1/00; H04L 9/3242; H04L 9/0637
(Continued)

(56) References Cited

U.S. PATENT DOCUMENTS 5,386,469 A * 1/1995 Yearsley .................. G09C 1/00
                                                     713/190
2003/0046563 A1   3/2003 Ma et al.
(Continued)

FOREIGN PATENT DOCUMENTS

FR   3 071 082 A1   3/2019

OTHER PUBLICATIONS

French Preliminary Search Report dated Jul. 24, 2020 in French Application 19 13764 filed Dec. 4, 2019 (with English Translation of Categories of Cited Documents and Written Opinion), 11 pages.

*Primary Examiner* — Jacob Lipman
(74) *Attorney, Agent, or Firm* — Oblon, McClelland, Maier & Neustadt, L.L.P.

(57) ABSTRACT

A method for executing a computer program, wherein when a microprocessor writes a block of $N_o$ bytes of a datum of a block of cleartext data stored in an unencrypted memory, a security module switches a validity indicator associated with this block of $N_o$ bytes to an active state wherein it indicates that this block of bytes is valid, and each time a block of $N_o$ bytes of a datum of the block of cleartext data is loaded by the microprocessor from the unencrypted memory, the hardware security module verifies whether the validity indicator associated with this block of $N_o$ bytes is in its active state and, if such is the case, processing, by the microprocessor, of this block of $N_o$ bytes is permitted, and, if such is not the case, processing, by the microprocessor, of this block of $N_o$ bytes is forbidden.

9 Claims, 3 Drawing Sheets

Figure 1:
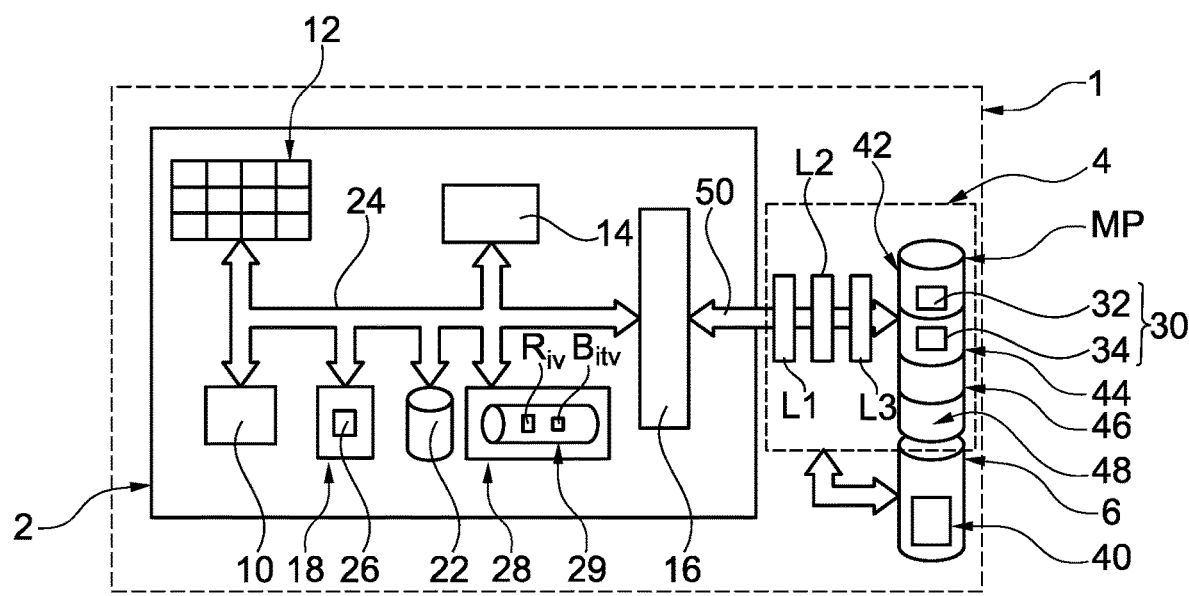

(51) Int. Cl.
*G06F 21/31* (2013.01)
*G06F 21/79* (2013.01)

(58) Field of Classification Search
USPC .......................................................... 726/26
See application file for complete search history.

(56) References Cited

U.S. PATENT DOCUMENTS

| | | | |
|---|---|---|---|
| 2011/0022853 A1* | 1/2011 | Donie | G06F 21/78 713/190 |
| 2016/0277373 A1* | 9/2016 | Murray | H04L 9/0637 |
| 2016/0364343 A1* | 12/2016 | Case | G06F 12/145 |
| 2019/0230072 A1 | 7/2019 | Murray | |
| 2019/0362081 A1 | 11/2019 | Kanno | |

* cited by examiner

METHOD FOR EXECUTING A COMPUTER PROGRAM BY MEANS OF AN ELECTRONIC APPARATUS

The invention relates to a method for executing a computer program by means of an electronic apparatus comprising a microprocessor, an unencrypted memory, an encrypted memory and a hardware security module.

The invention also relates to:
- a binary code able to be executed by a microprocessor implementing this method,
- a hardware security module and a compiler for implementing this method.

For security reasons, it is known to store processed data, during the execution of a computer program, in encrypted form in a memory. Below, the memory or memory portion that contains these encrypted data is called the "encrypted memory". In this case, each time a datum must be loaded into the microprocessor in order to be processed thereby, the encrypted datum is first transferred from the encrypted memory to an unencrypted memory. Below, a memory in which the data are stored in unencrypted form is called an "unencrypted memory". During this transfer, the integrity of the datum to be loaded is first verified. Only if the integrity of the datum is confirmed, is the datum then decrypted then stored in the unencrypted memory.

In this context, data are also transferred, in the opposite direction, from the unencrypted memory to the encrypted memory to be stored therein. During this transfer, the datum is encrypted, then the authentication code allowing its integrity to be verified is computed. Lastly, the encrypted datum and its authentication code are stored in the encrypted memory.

The operations of verifying the integrity of a datum and of decrypting this datum take a relatively long time. Likewise, the operations of encrypting, and of computing an authentication code also take a relatively long time. Thus, to accelerate the transfers of data between the unencrypted memory and the encrypted memory, it has already been proposed to perform these transfers in blocks of a plurality of data, rather than transferring each datum individually. In this case, the block of data is stored in the encrypted memory in the form of a block of encrypted and authenticated data.

Such a block of encrypted and authenticated data notably comprises:
- a cryptogram of the block of cleartext data, and
- an authentication code of this cryptogram.

The cryptogram of the block of cleartext data is obtained by processing the block of data as a single block of bits and without distinguishing between the data. Thus, to obtain a cryptogram, a single encrypting operation is executed instead of one encrypting operation per datum of this block of data. This accelerates the operation of encrypting the data. However, the cryptogram can be decrypted only in a single decrypting operation. In particular, it is not possible to decrypt only one single portion of the data without decrypting the entirety of the cryptogram.

Similarly, the authentication code is common to all of the data of the block of data. It is therefore computed in a single operation in which the block of data is processed as a single block. Thus, the need to construct one authentication code for each datum of this block of data is avoided. This also accelerates the construction of the authentication code.

During the transfer of a block of encrypted and authenticated data from the encrypted memory to the unencrypted memory, the microprocessor firstly verifies the integrity of the transferred cryptogram using the authentication code contained in this block of encrypted and authenticated data. If the verification fails, processing of the data contained in this block of encrypted and authenticated data is forbidden. In contrast, if the verification succeeds, the block of encrypted and authenticated data is then decrypted to obtain a block of cleartext data.

Next, the block of cleartext data is stored in the unencrypted memory.

During the transfer of a block of data from the decrypted memory to the encrypted memory, the inverse operations are carried out. In particular:
- the block of cleartext data is encrypted to obtain its cryptogram, then
- the authentication code is computed, then
- the block of encrypted and authenticated data is obtained by grouping the cryptogram and the computed authentication code together.

The block of encrypted and authenticated data thus obtained is then stored in the encrypted memory.

Now, there are often, in the binary codes of computer programs, data that have not explicitly been initialized at a preset value during the compilation that led to the generation of this binary code. The values of non-initialized data are therefore unknown, at least at the start of the execution of this binary code. To prevent them from being used before they are initialized, during the execution of the binary code, they are often grouped together in a portion of the main memory that is divided into blocks of non-initialized data. The blocks of non-initialized data have the same structure as the blocks of encrypted and authenticated data, except that the authentication code associated with each block of non-initialized data is incorrect. Thus, if a block of non-initialized data is loaded from the encrypted memory into the decrypted memory before its initialization, verification of the authentication code fails and processing of the non-initialized data is prevented. In contrast, it is possible to write data to the block of non-initialized data in order, notably, to allow them to be initialized to a known value. Thus, if the instruction executed by the microprocessor is an instruction to write a datum, this datum is written to the block of non-initialized data, this allowing it to be initialized to a known value and it to be used in subsequent processing operations.

The fact that processing of non-initialized data is forbidden makes it possible to prevent an attacker from being able to cause an unexpected operation of the binary code. Specifically, such an unexpected operation could, for example, lead to confidential information being accessed.

The inventors have however discovered that it still remains possible to cause such an unexpected operation of the binary code. For example, to do this, a block of non-initialized data is firstly loaded from the encrypted memory into the unencrypted memory. Next, a limited number of bytes of this block of data is initialized, by writing to this block of non-initialized data. Thus, at this stage, this block of data contains both initialized data and non-initialized data. It is therefore partially initialized. Lastly, when the partially initialized block of data is no longer being used, it is saved in the encrypted memory. As explained above, during the transfer from the unencrypted memory to the encrypted memory, the authentication code is computed using all of the data of the partially initialized block of data. Therefore, the computation of the authentication code takes into account both initialized data and non-initialized data.

Thus, consequently, a block of encrypted and authenticated data that contains both initialized data and non-initialized data is stored in the encrypted memory. Subsequently, when this block of encrypted and authenticated data is transferred, once again, from the encrypted memory to the decrypted memory, the verification of the integrity of this block of data succeeds and the non-initialized data are loaded into the unencrypted memory. In this case, nothing prevents these non-initialized data from being processed by the microprocessor.

In this way it is therefore possible to cause an unexpected operation of the binary code during its execution. In particular, to cause non-initialized data to be processed by the microprocessor, a block of encrypted and authenticated data that is known to contain solely data all of which will be processed by the microprocessor at one time or another is replaced by the block of encrypted and authenticated data that contains non-initialized data. In this case, it is certain that, at one time or another, the microprocessor will load the non-initialized datum then process it as though it were a datum that had been correctly initialized, even though this is not the case.

Prior art is also known from FR3071082A1, US2016277373A1 and US2019362081A1.

The invention therefore aims to increase the security of such a method for executing a computer program by means of an electronic apparatus comprising a microprocessor, an unencrypted memory, an encrypted memory and a hardware security module.

One subject of the invention is therefore a method for executing a computer program.

Another subject of the invention is a hardware security module for implementing the above execution method.

Yet another subject of the invention is a compiler able to automatically convert a source code of a computer program into a binary code of this computer program, wherein the compiler is able to automatically convert the source code into a binary code such as described above.

Figure 2:
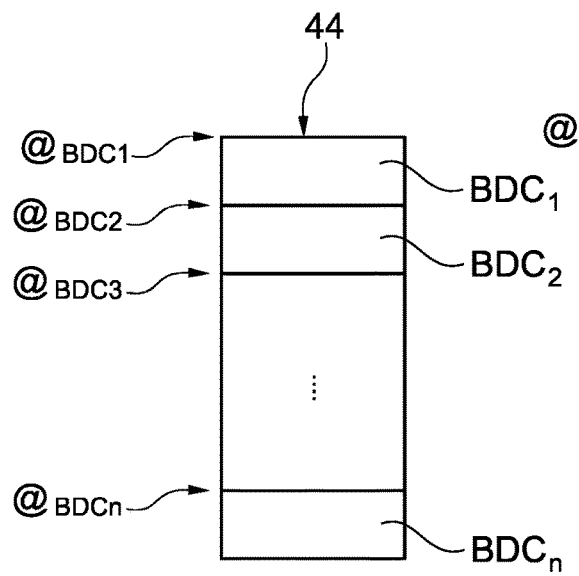
Figure 3:
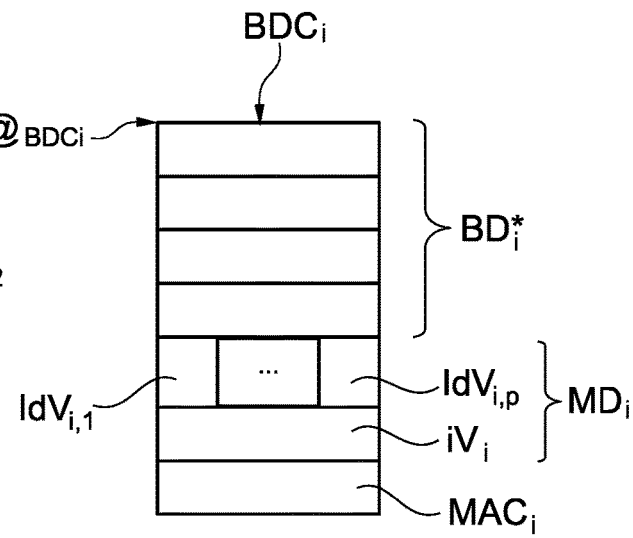
Figure 4:
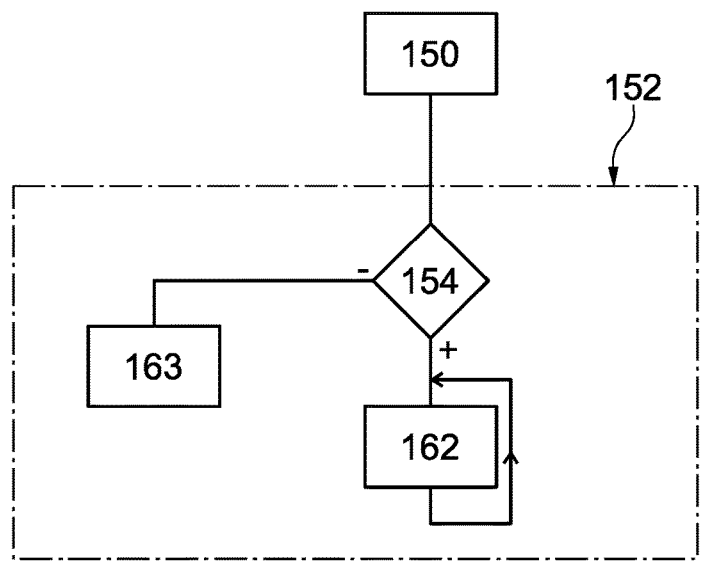
Figure 5:
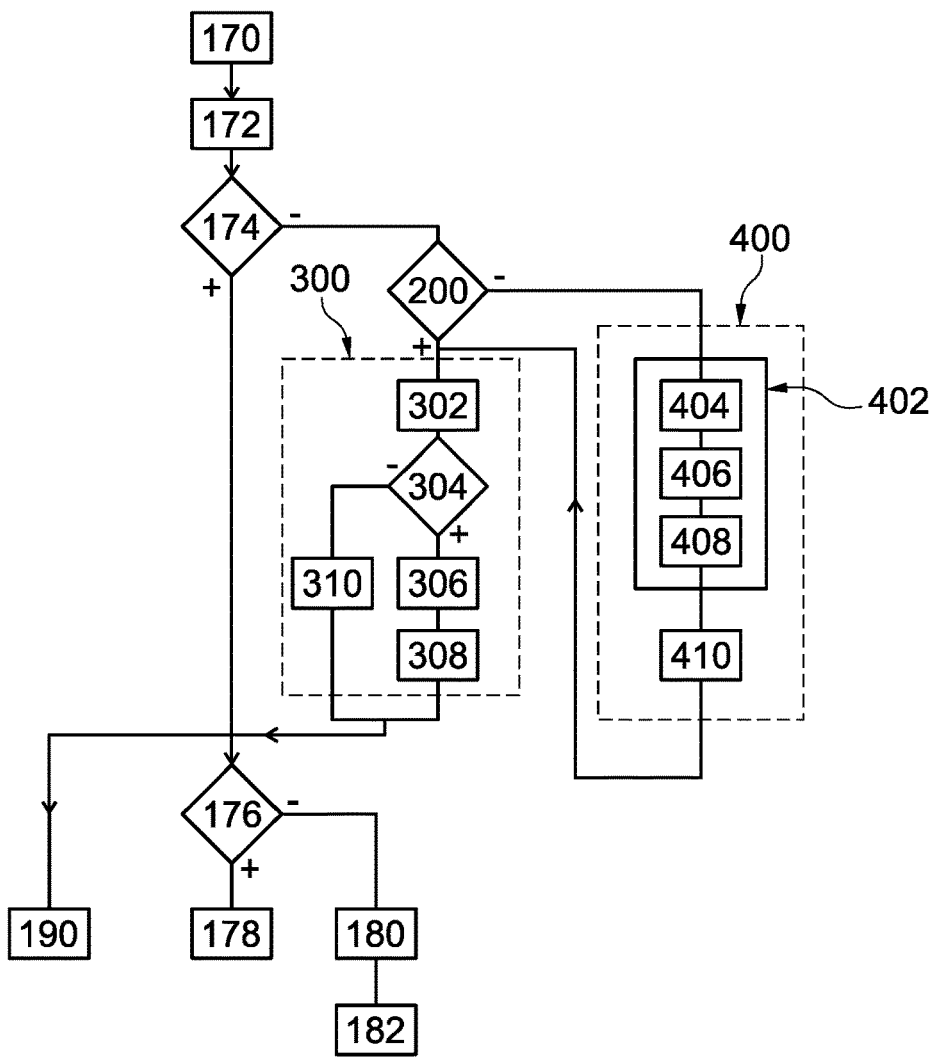
Figure 6:
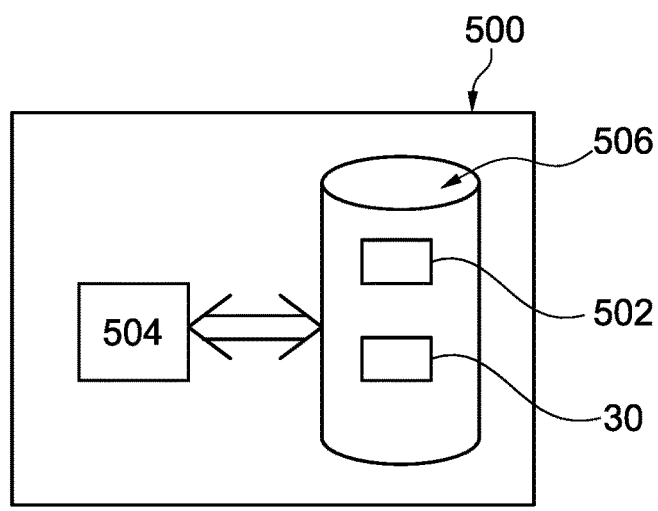

The invention will be better understood on reading the following description, which is given solely by way of non-limiting example, and with reference to the drawings, in which:

FIG. 1 is a schematic illustration of the architecture of an electronic apparatus able to execute a binary code of a computer program, FIG. 2 is a schematic illustration of a portion of a main memory of the apparatus of FIG. 1, FIG. 3 is a schematic illustration of the structure of a block of encrypted and authenticated data contained in the portion of the memory of FIG. 2, FIG. 4 is a flowchart of a method for executing the binary code by means of the apparatus of FIG. 1, and FIG. 5 is a flowchart of a method detailing the operations carried out when the executed instruction of the binary code is an instruction to load or to write a datum, FIG. 6 is a schematic illustration of a compiler able to generate the binary code executed by the apparatus of FIG. 1.

The conventions, notations and definitions used in this description are given in Section I. Next, a detailed exemplary embodiment is described in Section II with reference to the figures. In the subsequent section, Section III, variants of this detailed embodiment are presented. Lastly, the advantages of the various embodiments are presented in Section IV.

Section I: Conventions, Notations and Definitions

In the figures, the same references have been used to designate elements that are the same. In the rest of this description, features and functions that are well known to those skilled in the art will not be described in detail.

In this description, the following definitions have been adopted.

A "program" designates a set of one or more preset functions that it is desired to have executed by a microprocessor.

A "source code" is a representation of the program in a programming language. The source code is not directly executable by a microprocessor. The source code is intended to be converted by a compiler into a binary code directly executable by the microprocessor.

A program or a code is said to be "able to be executed directly" or "directly executable" when it is able to be executed by a microprocessor without this microprocessor needing to compile it beforehand by way of a compiler or to interpret it by way of an interpreter.

An "instruction" denotes a machine instruction able to be executed by a microprocessor. Such an instruction consists:
of an opcode, or operation code, that codes the nature of the operation to be executed, and
of one or more operands defining the value(s) of the parameters of this operation.

The instruction set architecture of a microprocessor is formed by all of the opcodes usable to form instructions executable by the microprocessor. The instruction set architecture may be different from one microprocessor to another.

A "machine code" is a set of machine instructions. It typically is a file containing a sequence of bits with the value "0" or "1", these bits coding the instructions to be executed by the microprocessor. The machine code is able to be executed directly by the microprocessor, that is to say without the need for a preliminary compilation or interpretation.

A "binary code" is a file containing a sequence of bits bearing the value "0" or "1". These bits code data and instructions to be executed by the microprocessor. The binary code thus comprises at least one machine code and also, in general, digital data processed by this machine code.

In the binary code, an instruction and a datum both correspond to bits. However, the instructions and the data are not processed in the same way by a microprocessor. For example, an instruction is solely loaded then executed by the microprocessor when the instruction pointer points to this instruction. A datum is loaded by the microprocessor only in response to the execution by this microprocessor of an instruction to load this datum.

The expression "execution of a routine" is understood to designate execution of the instructions making up this routine.

Section II: Detailed Exemplary Embodiment

FIG. 1 shows an electronic apparatus 1 comprising a microprocessor 2, a set 4 of memories and a mass storage medium 6. For example, the apparatus 1 is a computer, a smartphone, an electronic tablet or the like.

The microprocessor 2 here comprises:
an arithmetic logic unit 10;
a set 12 of registers;
a data buffer 14;
a data input/output interface 16,
an instruction loader 18 having an instruction pointer 26,
a queue 22 of instructions to be executed, and
a hardware security module 28 comprising a secure non-volatile memory 29.

The set 4 is configured to store the instructions and data of a binary code 30 of a program that must be executed by the microprocessor 2. The set 4 is a random-access memory. The set 4 is typically a volatile memory. Each datum and each instruction is associated with a physical address that is used to read it or to write it without modifying the other data and instructions. Thus, below, these data and instructions are said to be individually addressable. By way of illustration, in this embodiment, the data and instructions are each coded on 32 bits and are therefore each formed by four bytes. Below, the size of a datum, in number of bytes, is denoted $T_d$.

For example, the set 4 comprises:
three cache-memory levels, and
a main memory MP.

The cache memories allow the transfer of data between the main memory MP and the microprocessor 2 to be accelerated. The three cache-memory levels are conventionally called L1, L2 and L3. In FIG. 1, the symbols "L1", "L2" and "L3" have been used to designate the three cache memories L1, L2 and L3, respectively. Here, to simplify FIG. 1, the cache memory L1 is shown outside the microprocessor 2 whereas, often, it is integrated into the microprocessor 2. Here, a memory is considered to be outside of the microprocessor when it is produced on a substrate different from that used to produce the various components of the microprocessor 2. Generally, the other cache memories are outside the microprocessor 2. The memories L1 to L3 are classed in order of the speed at which data can be read, the memory L1 being the fastest. Generally, the size of cache memories is inversely proportional to their speed. Thus, here, the memory L1 is smaller in size than the memory L2, which itself is smaller in size than the memory L3.

Conventionally, after the binary code 30 has been loaded into the memory MP, the memory MP notably comprises the following portions:
a first portion 42 containing the instructions to be executed,
a second portion 44 containing the data to be processed,
a third portion 46 used to save the execution context of a routine when it calls another routine, and
a fourth portion 48 used to dynamically allocate memory to the program during execution with a view to storing data therein.

The portion 42 is known as the "code segment" or "text segment".

The portion 44 typically contains the static and global variables of the executed program. The portion 44 is itself conventionally divided into first and second sections. The first section contains static and global variables that were initialized during compilation. This first section is known as the data segment and often denoted ".data". The second section comprises static and global variables that were not initialized during the compilation of the binary code 30. This second section is also known as the "bss segment" and often denoted ".bss". Generally, these two sections are contiguous.

The portion 46 is known as the "call stack". Therefore, below, the portion 46 is also called the "stack 46". Lastly, the portion 48 is known as the "heap". Therefore, below, the portion 48 is also called the "heap 48".

The binary code 30 notably comprises a machine code 32 and a block 34 of data necessary to the execution of the binary code 30. The machine code 32 and the block 34 are stored in portions 42 and 44, respectively.

The execution of the binary code 30 thus starts with loading and processing the data of the block 34. Here, in particular, the block 34 comprises a cryptogram ka*obtained by encrypting a secret key ka using a public key $pk_{CPU}$ of the microprocessor 2.

The memory set 4 is connected to the microprocessor 2 by a databus and an address bus. To simplify FIG. 1, these two buses have been represented by a double-headed arrow 50 and are collectively designated in the rest of this description by the term "bus 50".

The set 4 is a set of encrypted memories, i.e. a set in which the data are stored in encrypted form. Below, the description is given in the particular case where the encrypted data are those contained in the portion 44. A division into blocks of encrypted and authenticated data of the portion 44 is shown in FIG. 2. In this figure and in the rest of the description, a block of encrypted and authenticated data stored in the memory MP at the address $@_{BDCi}$ is denoted "$BDC_i$", where the index i is an identifier of this block $BDC_i$. Here, the index i is the order number of the block of data, counted from the first block $BDC_1$, i.e. the block located at the start of the portion 44. The address $@_{BDCi}$ is here equal to the address at which the block $BDC_i$ starts. In this example, the index i varies from 1 to n so that the portion 44 is divided in n distinct blocks $BDC_i$. In FIGS. 2 to 6, the symbol " . . . " indicates that some of the elements have not been shown.

Here, all the blocks $BDC_i$ are structurally identical. Thus, only the block $BDC_i$ shown in FIG. 3 is described in detail. The size of the block $BDC_i$ in number of bytes is denoted $T_b$ below. The size $T_b$ is larger than eight or sixteen and, generally, higher than or equal to 32 or 64 bytes. Generally, the size $T_b$ is smaller than 1 kB or 1 MB. In this first embodiment, by way of illustration, the size $T_b$ is equal to thirty-two bytes The block $BDC_i$ comprises, in order starting from the address $@_{BDCi}$ of the start thereof:
a cryptogram $BD_i^*$,
metadata $MD_i$, and
an authentication code $MAC_i$.

The cryptogram $BD_i^*$ is obtained by encrypting a block $BD_i$ of $N_d$ cleartext data $D_{i,j}$ using the cryptographic key ka, where $N_d$ is an integer number higher than one or two or four. Here, $N_d$ is equal to four. The index j is an identifier of the datum $D_{i,j}$ that allows it to be distinguished from the other data contained in the same block $BD_i$. Here, the index j is the order number of the datum $D_{i,j}$ counted from the first datum $D_{i,1}$ of the block $BD_i$, i.e. from the datum $D_{i,1}$ located at the address $@_{BDi}$.

More precisely, the cryptogram $BD_i^*$ is obtained using the following relationship: $BD_i^* = f_{ka}(BD_i; iv_i)$, where:
$f_{ka}$ is an encryption function, corresponding to a decrypting function $f_{ka}^{-1}$, and
$iv_i$ is an initialization vector, also known as a "nonce".

The functions $f_{ka}$ and $f_{ka}^{-1}$ are pre-programmed in the module 28. The function $f_{ka}$ is typically a symmetric encryption function.

The vector $iv_i$ is an initialization vector the value of which is modified each time the function $f_{ka}$ is used to encrypt a block $BD_i$ of cleartext data. In contrast, the key ka remains the same. Therefore, the key ka allowing the cryptogram $BD_i^*$ to be decrypted is stored beforehand in the memory 29 in order to allow the module 28 to decrypt each cryptogram $BD_i^*$.

In this embodiment, each block $BD_i$ contains $N_d$ data associated with respective and consecutive physical addresses. Thus, each block $BD_i$ therefore corresponds to a continuous range of $N_d$ consecutive physical addresses. These ranges of physical addresses are distinct from one another. In particular, they do not overlap so that a given datum $D_{i,j}$ cannot be contained in a plurality of different blocks $BD_i$. In addition, these ranges of addresses are contiguous with one another so that there are, between a first and a second contiguous block $BD_i$, $BD_{i+1}$, no data that belong neither to the block $BD_i$ nor to the block $BD_{i+1}$. Thus, the blocks $BD_i$ divide the memory space in which the data are stored into a succession of consecutive blocks of data. Inside a given block $BD_i$, the $N_d$ data $D_{i,j}$ are, for example, classified in order of increasing physical address so that the datum $D_{i,1}$ is the first datum of the block $BD_i$. Under these conditions, the physical address @$BD_i$ of the start of the block $BD_i$ is equal to the physical address of the datum $D_{i,1}$.

The size $T_{BD}$ of the block $BD_i$ is equal to $N_d T_d$, where $T_d$ is the size of a datum $D_{i,j}$ in number of bytes. Here, the size of the cryptogram $BD_i^*$ is equal to the size of the block $BD_i$.

The metadata $MD_i$ here contain:
for each datum $D_{i,j}$ and for each block of $N_d$ bytes of this datum $D_{i,j}$, one validity indicator $IdV_{i,p}$, and
the vector $iv_i$ used to obtain the cryptogram $BD_i^*$.

The index p is an identifier of the indicator $IdV_{i,p}$, which allows it to be distinguished from all the other indicators contained in the metadata $MD_i$. Here, the index p is the order number of the indicator $IdV_{i,p}$, which is counted from the first indicator i.e. the indicator located just after the cryptogram $BD_i^*$. Thus, the number of indicators $IdV_{i,p}$ is equal to $(T_d/N_o) \cdot N_d$. Here, $T_d$ is equal to four. In this description, the symbol "·" designates the operation of scalar multiplication.

Each indicator $IdV_{i,p}$ is moveable between an active state and an inactive state. In the active state, the indicator $IdV_{i,p}$ indicates that the p-th block of $N_o$ bytes of the block $BD_i$ of cleartext data is valid. In contrast, in the inactive state, the indicator $IdV_{i,p}$ indicates that the p-th block of $N_o$ bytes of the block $BD_i$ of cleartext data is invalid. To this end, each indicator $IdV_{i,p}$ is coded on a single bit. For example, the values "0" and "1" of this bit correspond to the inactive and active states, respectively. The role of these indicators $IdV_{i,p}$ is detailed below with reference to FIG. 5.

The code $MAC_i$ is an integrity tag that allows the integrity of the block $BD_i$ of data to be verified. To this end, the code $MAC_i$ is a code allowing the integrity and authenticity of the cryptogram $BD_i^*$ to be verified. In addition, in this embodiment, the code $MAC_i$ also allows the integrity and authenticity of the indicators $IdV_{i,p}$ to be verified. This code $MAC_i$ is what is commonly called a "message authentication code" (MAC). Such a code $MAC_i$ is obtained by constructing a digital fingerprint using the cryptogram $BD_i^*$ and indicators $IdV_{i,p}$. This digital fingerprint normally comprises fewer bits than the cryptogram $BD_i^*$. Such a digital fingerprint is better known as a "digest" or "hash". This digital fingerprint is constructed using a preset function and a secret key k' known only to the author of the binary code 30 and to the microprocessor 2. Here, the key k' is stored beforehand in the memory 29 of the security module 28. For example, the preset function is a one-way function such as a hash function. In this case, generally, the digital fingerprint is the result of applying this hash function to a combination, for example a concatenation, of the cryptogram $BD_i^*$, of the indicators $IdV_{i,p}$ and of the key k'. The code $MAC_i$ is typically larger than or equal to 32 bits or 64 bits in size. The code $MAC_i$ is eight bytes (64 bits) in size.

In this embodiment, to accelerate the transfers of data between the microprocessor 2 and the set 4 of memories, the sizes $T_b$ and $T_{BD}$ are both powers of two. To achieve this, the size $T_b$ is equal to two times the size $T_{BD}$. Thus, in this example, $T_b$ is equal to thirty-two bytes. Under these conditions, the metadata $MD_i$ are eight bytes in size. Among these eight bytes, two thereof are used to store the indicators $IdV_{i,p}$ and the remaining two bytes are used to store the vector $iv_i$.

Lastly, the physical address @$_{BDCi}$ at which the block $BDC_i$ is stored in the memory MP is defined by the following relationship, relationship (1): @$_{BDCi}$=@$_{BDi} \cdot T_b/T_{BD}$. The ratio @$_{BDi}/T_{BD}$ is here necessarily an integer number since the address @$_{BDi}$ is equal to the sum of the sizes of the blocks $BD_1$ to $BD_{i+1}$. Thus, the blocks $BDC_i$ are classified in the memory MP in the same order as the blocks $BD_i$, i.e. in order of increasing physical addresses of the data $D_{i,j}$ that are encrypted in this block $BDC_i$. In addition, relationship (1) requires the blocks $BDC_i$ to be, in the memory $MP_i$, immediately consecutive to one another and to not overlap.

In this example, the instruction set architecture of the microprocessor 2 notably comprises a write instruction and a load instruction.

A write instruction is an instruction that, when it is executed by the unit 10, causes one or more bytes to be written to the set 4. Here, the instruction set architecture notably comprises a write instruction that allows a block of $N_o$ bytes smaller than the size of a datum to be written. In other words, $N_o$ is smaller than $T_d$. Thus, the smallest granularity with which it is possible to write to the set 4 is smaller than the size $T_d$ of a datum. In particular, the microprocessor 2 may write only $N_o$ bytes of a datum without writing the other bytes of the same datum. In this example, $N_o$ is equal to one.

A load instruction is an instruction that, when it is executed by the unit 10, causes one or more bytes to be loaded into the microprocessor 2 from the set 4. Generally, the loaded block of bytes is stored in a register of the microprocessor such as, for example, one of the registers of the set 12. Here, the instruction set architecture of the microprocessor 2 comprises a load instruction that allows only a block of $N_o$ bytes and therefore a block smaller than the size $T_d$ of a datum to be loaded.

By way of illustration, the microprocessor 2 is a reduced-instruction-set computer (RISC) and implements the "RISC-V" instruction set.

The unit 10 here is an $N_{inst}$-bit arithmetic logic unit. $N_{inst}$ is typically an integer higher than or equal to 8, 16, 32 or 64. In this example, $N_{inst}$ is equal to 32.

The loader 18 loads the next instruction to be executed by the unit 10 into the queue 22 from the set 4 of memories. More precisely, the loader 18 loads the instruction to which the instruction pointer 26 points.

The unit 10 is notably configured to execute one after another the instructions loaded into the queue 22. The instructions loaded into the queue 22 are generally automatically executed in the order in which these instructions were stored in this queue 22. The unit 10 is also capable of storing the result of these executed instructions in one or more of the registers of the set 12.

In this description, "execution by the microprocessor 2" and "execution by the unit 10" will be used synonymously.

The buffer 14 is used to further accelerate the transfers of data between the microprocessor 2 and the memory set 4. To do this, the data transferred between the microprocessor 2 and the set 4 are systematically transferred in entire blocks containing exactly $N_d$ data. More precisely, when a datum is loaded from the set 4, it is the block $BDC_i$ that contains this datum that is transferred, in its entirety, to the microprocessor 2 via the bus 50. Similarly, when a datum must be written to the set 4 of memories, it is a complete block $BDC_i$, containing this written datum, that is transferred from the microprocessor 2 to the set 4 via the bus 50.

Here, the buffer 14 is an unencrypted memory, i.e. a memory in which the data are stored in clear form (i.e. in cleartext). This buffer 14 is able to contain at least one block $BD_i$ of cleartext data. In this embodiment, by way of illustration, it is able to contain a single block $BD_i$ of data.

The module 28 is capable of automatically executing the various operations described in detail with reference to FIG. 5, in order to make the execution of the computer program secure. In particular, it is able to convert a block $BDC_i$ into a block $BD_i$ of cleartext data and vice versa. The module 28 operates independently and without using the unit 10. It is thus capable of processing blocks of data before and/or after they have been processed by the unit 10. To this end, it notably comprises the secure non-volatile memory 29. This memory 29 can only be accessed via the module 28. In this embodiment, the module 28 is pre-programmed, for example during its manufacture, to execute operations such as the following operations:
 verify the integrity and authenticity of a block $BDC_i$ using the code $MAC_i$ that it contains,
 compute a code $MAC_i$,
 encrypt the block $BD_i$ to obtain the cryptogram $BD_i^*$,
 decrypt the cryptogram $BD_i^*$ to obtain the block $BD_i$ of cleartext data.

The memory 29 is used to store the secret information required to implement the method of FIG. 5. Here, it therefore notably comprises secret information that was stored before the start of the execution of the binary code 30. In particular, it comprises the following information stored beforehand:
 a secret key k' used for the computation and verification of the codes $MAC_i$,
 a secret private key $sk_{CPU}$ that allows the data encrypted using the public key $pk_{CPU}$ to be decrypted.
In this embodiment, the memory 29 also comprises:
 a register $R_{iv}$ of initialization vectors, and
 a register $B_{itV}$ of validity indicators.

In this exemplary embodiment, the set 12 comprises general registers that are usable to store any type of data.

A bus 24 for exchanging data links the various components of the microprocessor 2 to one another. It has been shown in FIG. 1 in order to indicate that the various components of the microprocessor 2 are able to exchange data with one another.

The medium 6 is typically a non-volatile memory. It is for example an EEPROM or Flash memory. Here, it contains a backup copy 40 of the binary code 30. It is typically this copy 40 that is automatically copied to the memory 4 to restore the code 30, for example after a loss of current or the like or just before the execution of the code 30 starts.

FIG. 4 shows a method for executing the binary code 30 by means of the microprocessor 2.

The method starts with a step 150 of generating and then delivering the binary code 30 to the memory MP. The binary code 30 is typically generated by a compiler, such as the one described below with reference to FIG. 6. The delivery of the binary code 30 then consists in storing the copy 40 on the medium 6. Next, for example, the microprocessor 2 copies the copy 40 to the memory MP in order to obtain a copy of the binary code 30 stored in the memory MP. Thus, in step 150, the blocks $BDC_i$ constructed during the compilation of the source code and contained in the binary code 30 are stored in the memory MP and, generally, in the portion 44. More precisely, blocks $BDC_i$ that contain data initialized by the compiler are stored in the data segment. Blocks $BDC_i$ that contain data that have not been explicitly initialized by the compiler are stored in the bss segment. A datum is considered to have been initialized if the compiler has explicitly assigned a value thereto. In addition, each time the compiler constructs a block $BDC_i$, it switches the indicators $IdV_{i,p}$ that are associated with the blocks of $N_o$ bytes initialized to the active state. In contrast, the indicators $IdV_{i,p}$ that are associated with blocks of $N_o$ bytes that have not been explicitly initialized are switched to their inactive state. Thus, in general, the indicators $IdV_{i,p}$ of all the blocks $BDC_i$ stored in the data segment are in their active state. In contrast, the indicators $IdV_{i,p}$ of all the blocks $BDC_i$ stored in the bss segment are in their inactive state.

Next, in a phase 152, the microprocessor 2 executes the binary code 30 and, in particular, the machine code 32.

The execution of the binary code 30 possibly begins with a step 154 of authenticating the author of this binary code. If the authentication completes successfully, then the method continues with a step 162. In contrast, if the authentication does not complete successfully, the module 28 then considers the authentication of the author of the binary code 30 to have failed and the method continues with a step 163. In step 163, the execution of the binary code 30 is stopped.

In step 162, the module 28 notably loads the cryptogram ka* contained in the block 34 and decrypts it using the key $sk_{CPU}$ contained in the memory 29. At the end of step 162, the key ka is contained in the memory 29.

Next, in step 162, the microprocessor 2 executes, one after another, the instructions of the machine code 32. In this step 162, load instructions and write instructions are executed. Below, these two types of instructions are collectively designated by the expression "access instruction" or "instruction to access the memory". Each time an instruction to access the memory is executed by the microprocessor 2, the method of FIG. 5 is executed.

The method for increasing the security of data stored in the set 4 will now be described with reference to FIG. 5 and in the case where the accessed datum is the datum $D_{i,j}$. The physical address associated with the datum $D_{i,j}$ is denoted $@_{Di,j}$ below.

In response to the execution of an instruction to access the datum $D_{i,j}$, in a step 170, the address $@_{Di,j}$ is transmitted to the module 28.

In a step 172, the module 28 determines the address $@_{BDCi}$ of the block $BDC_i$ that contains this datum $D_{i,j}$. To do this, the module 28 here computes the address $@_{BDCi}$ using the following relationship (2): $@_{BDCi}=E(@_{Di,j}/T_{BD})\cdot T_b$, where:
 E( . . . ) is the function that returns the integer part of the number between parentheses, and
 $T_{BD}$ and $T_b$ are the sizes, in number of bytes, of the block $BD_i$ and of the block $BDC_i$, respectively.

The function E( . . . ) is a floor function.

In the memory MP, the blocks $BDC_i$ are immediately consecutive to one another. In addition, they are classified in order of increasing physical addresses of the data $D_{i,j}$ that are encrypted in each of these blocks $BDC_i$. Thus, the term $E(@_{Di,j}/T_{BD})$ gives the order number of the block $BDC_i$ from which the datum $D_{i,j}$ may be loaded. Given that in this embodiment, the sizes $T_{BD}$ and $T_b$ are both powers of two, the division by the size $T_{BD}$ and the multiplication by the size $T_b$ may both be carried out by a shift register. A shift register shifts the bits of the number that it contains to the right to perform a division and to the left to perform a multiplication. More precisely, in this embodiment, the size $T_{BD}$ is equal to $2^4$ bytes and the size $T_b$ is equal to $2^5$ bytes. Here, the module 28 therefore comprises a hardware shift register. Under these conditions, the module 28 is capable of computing very rapidly, and typically in one clock cycle, the address @$_{BDCi}$.

Thus, here, to compute the address @$_{BDCi}$, the module 28 stores the address in its shift register then shifts four bits to the right the bits of the address stored in this register to obtain the result of the ratio @$_{Di,j}$/T$_{BD}$. Next, the module 28 computes the integer part of the obtained ratio then stores this integer part in the shift register. Lastly, the shift register shifts five bits to the left the bits of this integer part to obtain the address @$_{BDCi}$.

It is preferable for the computation of the address @$_{BDCi}$ to be very fast, because this computation is carried out each time a datum is accessed. Once the address @$_{BDCi}$ has been determined, the module 28 verifies whether the address @$_{BDCi}$ is equal to an address @$_{BDCc}$. The address @$_{BDCc}$ is the address of the block BDC$_c$ from which the block BD$_c$ currently contained in the buffer 14 was loaded. The address @$_{BDCc}$ is, for example, stored in the memory 29.

If such is the case, this means that the block BD$_i$ that contains the datum D$_{i,j}$ to be accessed has already been stored in the buffer 14. In other words, the blocks BD$_i$ and BD$_c$ are the same. In this case, the method continues:
  directly with a step 176 if the executed access instruction is a load instruction, or
  directly with a step 190 if the executed access instruction is a write instruction.

In step 176, for each byte to be loaded, the module 28 verifies whether the indicator IdV$_{i,p}$ associated with this byte is in the active state. To do this, the module 28 uses the indicators IdV$_{i,p}$ associated with each of the bytes of the block BD$_i$ that are stored in the register B$_{itV}$ of the memory 29.

If the indicator IdV$_{i,p}$ associated with this byte is in the active state, in a step 178, processing of this byte by the microprocessor 2 is permitted. In this case, it is then loaded directly from the buffer 14 then, for example, transferred to one of the registers of the set 12. Next, the unit 10 executes instructions to process the data stored in the registers of the set 12.

If the indicator IdV$_{i,p}$ associated with this byte is in the inactive state, processing, by the microprocessor 2, of this byte is forbidden. In this case, the method continues with a step 180 of inhibiting the bytes associated with these indicators IdV$_{i,p}$ in the inactive state from being loaded. For example, in step 180, none of the bytes that should have been loaded by the microprocessor 2 in response to the execution of the load instruction are loaded into a register of the set 12. In addition, here, in step 180, the module 28 flags a fault in the execution of the binary code 30.

In response to such flagging, in a step 182, the microprocessor 2 implements one or more corrective measures and/or one or more countermeasures. By way of example of a corrective measure, in step 182, the module 28 initializes, to a preset value, zero for example, the bytes of the block BD$_i$ that must be loaded but that have not yet been initialized. Thereafter, the module 28 switches the indicators IdV$_{i,p}$ associated with these initialized bytes to their active state.

A wide range of countermeasures are possible. The countermeasures implemented may have very different degrees of severity. For example, the countermeasures implemented may range from simply displaying or simply storing in memory an error message without interrupting the normal execution of the binary code, right up to definitively disabling the microprocessor 2. The microprocessor 2 is considered to be disabled when it is definitively put into a state in which it is incapable of executing any binary code.

Between these extreme degrees of severity, there are many other possible countermeasures, such as:
  indicating via a human-machine interface detection of the faults,
  immediately interrupting the execution of the binary code and/or resetting it, and
  deleting the binary code from the memory MP and/or deleting the backup copy 40 and/or deleting the secret data.

In step 190, the one or more bytes to be written are written directly to the block BD$_i$ of data currently stored in the buffer 14.

Before writing a byte to the buffer 14, the module 28 does not verify the state of the indicator IdV$_{i,p}$ associated with this byte. However, each time a byte is written to the buffer 14, the module 28 systematically switches the indicator IdV$_{i,p}$ associated with this byte to its active state. Specifically, as soon as the microprocessor 2 writes a byte, the value of this byte is initialized and its value is no longer unknown.

If, in step 174, the address @$_{BDCi}$ is different from the address contained in the memory 29, this means that the block BD$_c$ currently contained in the buffer 14 does not contain the datum D$_{i,j}$ to be accessed. In this case, the method continues with a step 200.

In step 200, the module 28 verifies whether the block BD$_c$ currently contained in the buffer 14 has been written. Typically, to do this, the module 28 verifies the state of a dirty bit. The dirty bit is switched to its active state each time a byte is written to a datum of the buffer 14. The active state of this dirty bit therefore indicates that the block BD$_c$ has been written.

Each time a new block of cleartext data is stored in the buffer 14, the dirty bit is switched to its inactive state. Thus, the inactive state of the dirty bit indicates that the block BD$_c$ stored in the buffer 14 has not been written.

If the dirty bit is in its inactive state, it is not necessary to store the block BD$_c$ of data in the set 4. In this case, the method continues directly with a step 300 of transferring the block BDC$_i$ that contains the encrypted datum D$_{i,j}$ from the set 4 to the buffer 14.

In the contrary case, the block BD$_c$ currently stored in the buffer 14 must be saved to the set 4. In this case, the method continues with a step 400 of transferring the block BD$_c$ currently contained in the buffer 14 to the set 4.

The step 300 starts with an operation 302 of loading the block BDC$_i$ located at the address @$_{BDCi}$ determined in step 172. Preferably, the block BDC$_i$ is loaded from the set 4 to the microprocessor over the bus 50 using a data block burst mode.

The loaded block BDC$_i$ is then temporarily stored in the microprocessor 2. For example, it is stored in the set 12 or in the memory 29 or in the buffer 14.

In the operation 304, the module 28 verifies the integrity of the block BDC$_i$. Here, it verifies the integrity and authenticity of the cryptogram BD$_i$* and of the indicators IdV$_{i,p}$ using the code MAC$_i$. To do this, the module 28 computes a code MAC$_i$' using the same algorithm as that implemented to construct the code MAC$_i$ except that it uses the cryptogram BD$_i$* and the indicators IdV$_{i,p}$ loaded in the operation 302. If the code MAC$_i$' thus constructed is identical to the loaded code MAC$_i$, then the integrity and authenticity of the cryptogram BD$_i$* and of the indicators IdV$_{i,p}$ are confirmed. In this case, the module 28 continues, in an operation 306, to decrypt the cryptogram BD$_i$* using, to do so, the key ka stored in its memory 29 and the vector iv$_i$ extracted from the metadata MD$_i$ of the loaded block BDC$_i$.

After the operation 306, in an operation 308, the obtained cleartext block $BD_i$ is stored in the buffer 14 in the place of the preceding block of data. The indicators $IdV_{i,p}$ contained in the loaded block $BDC_i$ are stored in the register $B_{itV}$ of the memory 29. The vector $iv_i$ is for its part stored in the register $R_{iv}$ of the memory 29. Lastly, the address $@_{BDCi}$ of the loaded block $BDC_i$ is also stored in the memory 29.

In the case where the verification of the integrity of the block $BDC_i$ fails, the module 28 continues with an operation 310 of preparing a virgin block $BD_i$. In this operation 310, the module 28 initializes all the data of the virgin block $BD_i$ to a preset value. Typically, this preset value is the value zero. Next, this virgin block $BD_i$ is stored in the buffer 14. Again in this operation 310, the module 28 also switches each of the indicators $IdV_{i,p}$ contained in the register $B_{itV}$ of the memory 29 to their inactive state. It also resets the value of the vector $iv_i$ contained in the register $R_{iv}$. For example, the new value of the vector $iv_i$ contained in the register $R_{iv}$ is generated via a random or pseudo-random draw. Lastly, the address $@_{BDCi}$ of the loaded block $BDC_i$ is also stored in the memory 29. Thus, in the case where the verification of the integrity of the block $BDC_i$ fails, it is a virgin block $BD_i$ that is stored in the buffer 14.

After the operation 308 or 310, the method continues with step 176 or step 190, depending on whether the instruction to be executed is a load instruction or a write instruction.

Step 400 starts with an operation 402 of conversion of the block $BD_c$ into a block $BDC_c$.

To achieve this conversion, in a sub-operation 404, the module 28 starts by generating a new vector $iv_i$. The new vector $iv_i$ is for example generated using the old value of this vector $iv_i$, which value is stored in the register $R_{iv}$. For example, the new vector $iv_i$ is obtained by incrementing this old value by a preset amount.

Next, in a sub-operation 406, the module 28 encrypts the block $BD_c$ currently contained in the buffer 14 using, to do so, the key ka and the new vector $iv_i$ generated in sub-operation 404. At the end of this operation, the cryptogram $BD_c^*$ is obtained.

In a sub-operation 408, the module 28 computes the new code $MAC_c$ using the cryptogram $BD_c^*$ obtained at the end of the sub-operation 406 and using the indicators $IdV_{c,p}$ currently contained in the register $B_{itV}$ of the memory 29.

Lastly, once the new code $MAC_c$ has been computed, at the end of sub-operation 408, the module 28 groups together, in the same block of data, the cryptogram $BD_c^*$, the indicators $IdV_{c,p}$ of the register $B_{itV}$, the new vector $iv_c$ and the new code $MAC_c$ in order to obtain a new block $BDC_c$.

Afterwards, in an operation 410, the new block $BDC_c$ is stored in the set 4 at the address $@_{BDCc}$ currently contained in the memory 29.

Step 400 then ends and the method continues with step 300.

FIG. 6 shows a compiler 500 able to automatically generate the binary code 30 from a source code 502. To this end, the compiler 500 typically comprises a programmable microprocessor 504 and a memory 506. The memory 506 contains the instructions and data required to automatically generate, when they are executed by the microprocessor 504, the binary code 30 from the source code 502. In particular, during the compilation of the source code 502, the microprocessor 504 automatically generates the blocks $BDC_i$ that will then be stored in the portion 44 of the memory MP after this binary code 30 has been loaded into this memory MP. More precisely, during the compilation, the compiler 500 converts each cleartext block $BD_i$ intended to be stored in the portion 44 of the memory MP into a block $BDC_i$ in a similar manner to the one that was described with reference to step 400. It is within the ability of a person skilled in the art to design and produce such a compiler, based on the explanations given in this description.

Section III: Variants

Variants of the Apparatus 1

Other embodiments of the set 4 are possible. For example, the set 4 may comprise a higher number of a lower number of cache memories. In a greatly simplified case, the set 4 comprises no cache memory and, for example, comprises only the main memory MP.

The memory MP may be a non-volatile memory. In this case, it is not necessary to copy the binary code 30 to this memory before launching its execution since it is already stored therein.

Whether a memory of the set 4 is integrated or not into the microprocessor 2 may be freely modified. Thus, as a variant, the cache memory L1 is located outside the microprocessor 2 and not therein. Likewise, in another variant, the cache memories L1 and L2 or even L3 are integrated into the microprocessor 2, i.e. produced on the same semiconductor chip as the unit 10 of the microprocessor 2. As a variant, the memory MP may also be an internal memory integrated into the microprocessor 2. In the latter case, it is produced on the same substrate as the other elements of the microprocessor 2. Lastly, in other configurations, the memory MP is composed of a plurality of memories certain of which are internal memories and others of which are external memories.

There are microprocessors the instruction set architecture of which only allows at least a plurality of bytes and not a single byte to be written at a time. In this case, $N_o$ is higher than one. For example, $N_o$ is equal to two. In this case, the indicator $IdV_{i,p}$ is not associated with each byte, but which each block of two bytes. In other embodiments, the number $N_o$ may be higher than two and, for example, equal to four. As a variant, the numbers $N_o$ and $T_d$ are equal. In this case, the smallest granularity with which the microprocessor 2 is able to write to the memory MP is the entire datum $D_{i,j}$. In this case, each datum $D_{i,j}$ is associated with a single indicator $IdV_{i,p}$.

Many different hardware architectures may be used to produce the module 28. In particular, the module 28 may be made up of a combination of a plurality of hardware blocks of the microprocessor 2 that perform respective functions and that are each located in a different area of the chip of the microprocessor 2.

As a variant, the buffer 14 is able to simultaneously contain a plurality of blocks of cleartext data.

Variants of the Authentication Code

Other methods for computing the authentication code are possible. For example, as a variant, the module 28 computes a first authentication code solely using the cryptogram $BD_i^*$ and a second authentication code solely using the indicators $IdV_{i,p}$. In this case, the authentication code contained in the block $BDC_i$ is the result, for example, of the concatenation of these first and second authentication codes. Next, the first and second authentication codes are used, by the module 28, to verify the integrity of the cryptogram $BD_i^*$ and of the indicators $IdV_{i,p}$, respectively, in the operation 304.

In another embodiment, the code $MAC_i$ is computed using the cryptogram $BD_i^*$ and without taking into account the indicators $IdV_{i,p}$. In this case, preferably, the indicators $IdV_{i,p}$ are then encrypted so that they are not in clear form in the block $BDC_i$. For example, they are encrypted using the function $f_{ka}$.

In another variant, Ie code $MAC_i$ is computed using cleartext data $D_{i,j}$ and not using the cryptogram $BD_i^*$. In this case, it is necessary to invert the order of the operations of verifying the integrity of the authentication code and of decrypting the cryptogram $BD_i^*$. Specifically, in this case, the data must first be decrypted and only then is the module 28 able to verify the integrity thereof.

Variants of the Metadata

As a variant, the metadata $MD_i$ comprise data other than the indicators $IdV_{i,p}$ and the vector $iv_i$. Conversely, in a simplified embodiment, the metadata $MD_i$ do not comprise the vector $iv_i$. In the latter case, the vector $iv_i$ to be used to decrypt the cryptogram $BD_i^*$ is then stored differently. For example, a register associating, with each block $BDC_i$, the vector $iv_i$ required to decrypt the cryptogram $BD_i^*$ is stored in the memory MP.

The metadata may be stored in the buffer 14 or in a register independent of the buffer 14 and of the memory 29. In the case where the metadata $MD_i$ are stored in the buffer 14, said metadata are, preferably, stored in an address range that is distinct from the address range in which the data $D_{i,j}$ are stored. Typically, this distinct address range is not addressable by the microprocessor, so that the presence of the metadata $MD_i$ in the buffer 14 in no way modifies the way in which the data $D_{i,j}$ are addressed. In contrast, the metadata $MD_i$ are accessible by the module 28, so that it can carry out the various steps described in Section II.

As a variant, when the new vector $iv_i$ of a block $BDC_i$ is generated without taking into account its preceding value, it is not necessary to save its preceding value to the register $R_{iv}$ after the block $BDC_i$ has been loaded into the buffer 14. This is for example the case when, on each transfer of a block of data from the buffer 14 to the set 4, the new vector $iv_i$ is generated via a random or pseudo-random draw.

Other methods for generating a new vector $iv_i$ are possible. For example, the new vector $iv_i$ is set equal to the preceding value of the code $MAC_i$. In this case, each time a block $BDC_i$ is transferred from the set 4 to the buffer 14, the code $MAC_i$ contained in this block $BDC_i$ is stored in the microprocessor, for example, in the memory 29.

The new vector $iv_i$ may also be completed with other information to obtain a complete initialization vector $ivc_i$, then, in the encrypting operation 406, it is this vector $ivc_i$ that is used instead of the vector $iv_i$. In this case, the cryptogram $BD_i^*$ is the result of the function $f_{ka}(BD_i; ivc_i)$. The decrypting operation 306 must then be modified accordingly. In other words, the cleartext block $BD_i$ is the result of the function $f_{ka}^{-1}(BD_i^*; ivc_i)$. For example, the vector $ivc_i$ is obtained by combining the vector $iv_i$ and the address $@_{BDCi}$ contained in the memory 29. For example, the vector $iv_i$ and the address $@_{BDCi}$ are concatenated. The vector $ivc_i$ may also be obtained by combining the vector $iv_i$ with an identifier of the binary code 30. In this case, the obtained cryptogram $BD_i^*$ is dependent on the binary code 30 to be executed. The vector $ivc_i$ may also be obtained by combining the vector $iv_i$, the address $@_{BDCi}$ and the identifier of the binary code 30.

Each indicator $IdV_{i,p}$ may be composed of a plurality of bits and not of a single bit as described above.

Variants of the Method

If an attempt is made to load a byte associated with an indicator $IdV_{i,p}$ in the inactive state, many other actions other than flagging an execution fault are possible. For example, one or more actions belonging to the group consisting of the following actions are triggered and executed:
  flagging an execution fault,
  initializing this byte to a preset value such as, for example, zero, and
  executing a counter-measure.

Likewise, when the verification of the integrity of the code $MAC_i$ fails, one or more of the actions of the above group may be triggered and executed.

As a variant, a relationship other than relationship (1) is used to determine the address $@_{BDCi}$ at which the block is stored $BDC_i$. In this case, relationship (2) must be modified accordingly. For example, in one particularly flexible embodiment, the module 28 comprises a lookup table that, with each address $@_{BDCi}$ of a cleartext block $BD_i$ associates the address $@_{BDCi}$ of the block $BDC_i$ containing the data $D_{i,j}$ in encrypted form. In such a case, the module 28 is able to determine the address $@_{BDCi}$ of the block containing the datum $D_{i,j}$ located at the address $@_{Di,j}$ by implementing the following steps:
  Step 1: the module 28 computes the address $@_{BDCi}$ of the block $BD_i$ that contains the datum $D_{i,j}$ using the following relationship: $@_{BDCi}=E(@_{Di,j}/T_{BD})\cdot T_{BD}$, then
  Step 2: the module 28 looks, in the lookup table, for the address $@_{BDCi}$ associated with the computed address $@_{BDi}$.

Because the sizes $T_b$ and $T_{BD}$ are both powers of two, the size $T_b$ is two times larger than the size $T_{BD}$. Thus, each time the size $T_{BD}$ is increased, the size $T_b$ must also be increased proportionally. This therefore amounts to increasing the space available to store the metadata $MD_i$ and the code $MAC_i$. However, it is not always desirable to increase the space available to store the metadata $MD_i$ and the code $MAC_i$ because this causes more memory space to be occupied, without necessarily improving the performance of the apparatus 1. Thus, as a variant, the size $T_b$ is not equal to two times the size $T_{BD}$. For example, the size $T_b$ is smaller than $2 T_{BD}$. In the latter case, preferably, the sizes $T_b$ and $T_{BD}$ are then chosen so that the number $(T_b-T_{BD})$ and the size $T_{BD}$ are both powers of two. In this case, relationship (1) is replaced by the following relationship, relationship (3): $@_{BDCi}=@_{BDi}+@_{BDi}(T_b-T_{BD})/T_{BD}$. Relationship (2) is replaced by the following relationship, relationship (4): $@_{BDCi}=E(@_{Di,j}/T_{BD})\cdot T_{BD}+E(@_{Di,j}/T_{BD})(T_b-T_{BD})$. In relationships (3) and (4), the multiplications and divisions may still be carried out using the shift registers of the module 28 and therefore very rapidly. In contrast, with respect to the case where relationships (1) and (2) are used, it is necessary to perform one extra addition operation to compute the address $@_{BDCi}$. Therefore, this variant is a little slower than the one described in Section II. In contrast, it has the advantage of permitting a size $T_{BD}$ that is larger than the size $(T_b-T_{BD})$, i.e. larger than the size of the metadata $MD_i$ and of the code $MAC_i$.

What was described in detail in the particular case of the portion 44 of the memory $MP_i$ applies to any other portion of the memory MP containing data to be protected. For example, this teaching may also be applied to the stack 46 or to the heap 48.

In the detailed exemplary embodiment, the transfer in entire blocks between the set 4 and the microprocessor 2 is solely implemented for the data and not for the instructions of the machine code 30. In this case, only the one or more memory spaces of the set 4 that are reserved for storing data are divided into successive blocks of encrypted and authenticated data. The memory space reserved for the storage of instructions is then, for example, used conventionally. Thus, in this embodiment, the instructions are transferred one by one to the microprocessor 2. In addition, in this case, the instructions are not necessarily stored in encrypted form in the set 4. However, what was described here in the particular case of the data may also be applied to the instructions of the machine code 32. Below, when a block contains instructions, it is called an "instruction block". For example, as described in the particular case of the data, the portion 42 of the memory MP that contains the instructions of the machine code is divided into successive and contiguous instruction blocks. For example, in a first embodiment, the structures of the block of data and of the instruction blocks are identical. In addition, the manner of proceeding is identical both in the case of the block of data and in the case of the instruction blocks. A person skilled in the art will be able to transpose, without difficulty, on the basis thereof, the teaching given here in the particular case of the blocks of data to the case of the instructions. It is therefore merely underlined that, in the case of instructions, the address of the next instruction to be loaded into the microprocessor 2 is contained in the instruction pointer 26 and not in a load instruction executed by the unit 10. It is also underlined that, preferably, the buffer used to store a cleartext instruction block is a buffer, for example one structurally identical to the buffer 14, but distinct from the buffer 14 and dedicated to storage of an instruction block. Lastly, it will be noted that, in the case of instructions, the latter are not conventionally intended to be modified individually via execution of a write instruction by the microprocessor. Thus, the problem that arises when a single datum of a block of data is modified does not arise in the case of instructions. The advantage of processing instructions and data in exactly the same way is above all the resulting harmonization of the processing operations and, therefore, simplification of the security module 28.

Other Variants

The various embodiments and the various variants have, up to now, been described in the particular case in which the unencrypted memory is the buffer 14 and the encrypted memory is the memory set 4, i.e. the memory of just higher rank. However, the teaching given here applies to any unencrypted and encrypted memories between which data are transferred in entire blocks of encrypted and authenticated data. For example, as a variant, the unencrypted memory is the cache memory L1 and the encrypted memory is the cache memory L2. In this case, the security module is, for example, implemented in the cache memory L1 to encrypt and decrypt the blocks $BDC_i$ that are transferred between these two cache memories L1 and L2. It will be noted that, in this case, the data are in cleartext in the cache memory L1 and are encrypted in the cache memory L2. Provided that the data are encrypted in the cache memory L2, they will necessarily be encrypted in the memories of higher rank. What is described here may also be applied between the cache memories L2 and L3 or between the cache memory L3 and the main memory MP.

In the case where the security module is solely implemented between two memory levels higher than the buffer 14, the buffer 14 may be removed.

Section IV: Advantages of the Described Embodiments

The fact of associating one indicator $IdV_{i,p}$ with each block of $N_o$ bytes allows the module 28 to detect that this block of $N_o$ bytes is invalid and to forbid processing thereof by the microprocessor 2, even if this block of $N_o$ bytes is located inside a block $BDC_i$ the integrity of which has, beforehand, been successfully verified during its transfer from the encrypted memory to the unencrypted memory. Thus, the method for executing a computer program is more robust to attacks that seek to exploit the presence of bytes that have not yet been initialized.

Computing the code $MAC_i$ contained in the block $BDC_i$ using indicators makes falsification of the values of these indicators very difficult. This therefore increases the security of the executing method.

The fact of storing the vector $iv_i$ in the metadata $MD_i$ allows each vector $iv_i$ required to decrypt the cryptogram $BD_i^*$ to simply be stored then found.

The fact that the module 28 itself constructs the address $@_{BDCi}$ at which the block $BDC_i$ must be stored in the encrypted memory makes the addition of the metadata $MD_i$ and of the code $MAC_i$ to the cryptogram $BD_i^*$ transparent to the unit 10. In practice, the unit 10 operates as though all the data were in clear text without having to preoccupy itself with encryption and decryption or the presence of metadata $MD_i$ in the encrypted memory. In particular, the addresses used by the microprocessor 2 to load or write a datum are the same as those that would be used in the case where the metadata $MD_i$ and the codes $MAC_i$ did not exist.

The fact that the module 28 itself computes the address $@_{BDCi}$ of the block $BDC_i$ from which may be loaded datum $D_{i,j}$ to be accessed makes the presence of the metadata $MD_i$ and of the code $MAC_i$ transparent to the unit 10. Specifically, it is the module 28 that carries out the address conversion and not the unit 10.

Storing, in the unencrypted memory, a virgin block of cleartext data each of the identifiers $IdV_{i,p}$ of which has been switched to its inactive state allows a memory segment dedicated to the storage of non-initialized data, such as the bss segment for example, to be used to securely store data therein that are initialized only during the execution of the binary code.

The invention claimed is:

1. A method for executing a computer program with an electronic apparatus comprising a microprocessor, an unencrypted memory, an encrypted memory and a hardware security module, wherein, during the execution of the computer program, the transfer of data between the unencrypted memory and the encrypted memory is carried out in entire blocks of a plurality of encrypted and authenticated data, each datum being composed of one or more blocks of $N_o$ bytes, where $N_o$ is equal to the lowest number of bytes that can be written, independently of the other bytes of the datum, by the microprocessor when it executes a write instruction of its instruction set architecture, the method comprising:

a) during the transfer of a block of cleartext data from the unencrypted memory to the encrypted memory:
converting the block of cleartext data into a block of encrypted and authenticated data, said conversion comprising:
encrypting the block of cleartext data to obtain a cryptogram of said block of cleartext data, said cryptogram being able to be decrypted solely in its entirety and not datum by datum,
computing an authentication code using the data of the block of cleartext data or using the cryptogram of said block of cleartext data, and grouping, in the same block, the obtained cryptogram, the computed authentication code and metadata to obtain the block of encrypted and authenticated data, then storing the obtained block of encrypted and authenticated data in the encrypted memory, b) during the transfer of a block of encrypted and authenticated data from the encrypted memory to the unencrypted memory:

verifying the integrity of the block of cleartext data or of the cryptogram of the block of cleartext data using the authentication code contained in said block of encrypted and authenticated data, when said verification fails, inhibiting processing, by the microprocessor, of the data of said block of data, and when said verification succeeds:
  decrypting the cryptogram contained in the block of encrypted and authenticated data to obtain the block of cleartext data,
  storing the obtained block of cleartext data in the unencrypted memory and
  storing the metadata of the block of encrypted and authenticated data in a register that is not addressable by the microprocessor, wherein the method comprises:

incorporating, into the metadata of each block of data and for each block of $N_o$ bytes of each datum of said block of data, a validity indicator associated with said block of $N_o$ bytes, said validity indicator being switchable between:
  an active state, in which said validity indicator indicates that said block of bytes is valid, and
  an inactive state, in which said validity indicator indicates that said block of bytes is invalid, at least certain of the validity indicators initially being in their inactive state, for blocks of $N_o$ bytes of a datum of said block of data that are set to the inactive state when stored in the encrypted memory, when the microprocessor writes a block of $N_o$ bytes of a datum of the block of cleartext data stored in the unencrypted memory, the security module switches the validity indicator associated with said block of $N_o$ bytes to its active state, each time a block of $N_o$ bytes of a datum of the block of cleartext data is loaded by the microprocessor from the unencrypted memory, the hardware security module verifies whether the validity indicator associated with said block of $N_o$ bytes is in its active state and, if such is the case, processing, by the microprocessor, of said block of $N_o$ bytes is permitted, and, if such is not the case, processing, by the microprocessor, of said block of $N_o$ bytes is forbidden.

2. The method as claimed in claim 1, wherein, during the computation of the authentication code, the authentication code is also computed using validity indicators associated with each group of $N_o$ bytes of each datum of the block of cleartext data.

3. The method as claimed in claim 1, wherein:
during the encryption of the cleartext data, the cleartext data are encrypted using a cryptographic key and an initialization vector, the cryptographic key used being the same on each transfer of a block of cleartext data from the unencrypted memory to the encrypted memory and the initialization vector being modified on each transfer of a block of cleartext data from the unencrypted memory to the encrypted memory, and the initialization vector used to obtain the cryptogram of said block of data is incorporated into the metadata of the block of encrypted and authenticated data, and during the decryption of the data, the hardware security module extracts from the metadata of the block of encrypted and authenticated data, the initialization vector to be used to carry out said decryption.

4. The method as claimed in claim 1, wherein each block of encrypted and authenticated data is stored at an address $@_{BDCi}$ equal to $@_{BDi} \cdot T_b/T_{BD}$, where:
  $@_{BDi}$ is the physical address of the start, in the unencrypted memory, of the block of cleartext data obtained by decrypting the cryptogram of said block of encrypted and authenticated data,
  $T_b$ is the size, in number of bytes, of the block of encrypted and authenticated data,
  $T_{BD}$ is the size, in number of bytes, of the block of cleartext data.

5. The method as claimed in claim 4, wherein:
each datum is associated, via a one-to-one relationship, with one physical address and each block of cleartext data contains only the $N_d$ data associated, via said one-to-one relationship, with physical addresses contained in a respective and continuous range of $N_d$ consecutive physical addresses, and the address $@_{BDi}$ of the start of said block of cleartext data is equal to the lowest physical address of said range of $N_d$ physical addresses, during the execution of the computer program, the microprocessor executes an instruction to access at least one block of $N_o$ bytes of a first datum associated with a physical address $@_{Di,j}$, said first datum belonging to none of the blocks of cleartext data currently stored in the unencrypted memory at the moment of the execution of said access instruction, in response, the hardware security module computes an address $@_{BDCi}$ equal to $E(@_{Di,j}/T_{BD}) \cdot T_b$, where
  $E( )$ is the function that returns the integer part of the number located between the parentheses, and
  $@_{BDCi}$ is the address of the start, in the encrypted memory, of the block of encrypted and authenticated data that contains the first datum, then the block of encrypted and authenticated data that starts at the computed address $@_{BDCi}$ is transferred from the encrypted memory to the unencrypted memory so as to store, in the unencrypted memory, a new block of cleartext data that contains the first datum, then said at least one block of $N_o$ bytes is accessed using the first datum contained in said new block of cleartext data.

6. The method as claimed in claim 5, wherein:
$T_b$ and $T_{BD}$ are both powers of two and the address $@_{BDCi}$ is computed using the following first relationship $@_{BDCi} = E(@_{Di,j}/T_{BD}) \cdot T_b$, or $(T_b - T_{BD})$ and $T_{BD}$ are both powers of two and the address $@_{BDCi}$ is computed using the following second relationship $@_{BDCi} = E(@_{Di,j}/T_{BD}) \cdot T_{BD} + E(@_{Di,j}/T_{BD})(T_b - T_{BD})$, and each division and each multiplication of the first and second relationships are executed by shift registers of the hardware security module.

7. The method as claimed in claim 1, wherein, when the verification of the integrity of the block of cleartext data or of the cryptogram of the block of cleartext data fails:
  a virgin block of cleartext data is prepared and stored in the unencrypted memory in the same location as that where the block of cleartext data would have been stored if the verification of the integrity had succeeded, the data of said virgin block all being initialized to a preset value, and the validity indicators associated with each of the blocks of $N_o$ bytes of the virgin block are switched to their inactive state.

8. A hardware security module for implementing the method as claimed in claim 1, wherein the hardware module is configured to:

a) during the transfer of a block of cleartext data from the unencrypted memory to the encrypted memory:

convert the block of cleartext data into a block of encrypted and authenticated data, said conversion comprising:

encrypting the block of cleartext data to obtain a cryptogram of said block of cleartext data, said cryptogram being able to be decrypted solely in its entirety and not datum by datum, computing an authentication code on the basis of the data of the block of cleartext data or on the basis of the cryptogram of the block of cleartext data, and grouping, in the same block, the obtained cryptogram, the computed authentication code and metadata to obtain the block of encrypted and authenticated data, then storing the obtained block of encrypted and authenticated data in the encrypted memory, b) during the transfer of a block of encrypted and authenticated data from the encrypted memory to the unencrypted memory:

verify the integrity of the block of cleartext data or of the cryptogram of the block of cleartext data using the authentication code contained in said block of encrypted and authenticated data, when said verification fails, inhibit processing, by the microprocessor, of the data of said block of data, and when said verification succeeds:

decrypt the cryptogram contained in the block of encrypted and authenticated data to obtain the block of cleartext data, store the obtained block of cleartext data in the unencrypted memory and store the metadata of the block of encrypted and authenticated data in a register that is not addressable by the microprocessor, wherein:

when the microprocessor modifies a block of $N_o$ bytes of a datum of the block of cleartext data stored in the unencrypted memory, the security module is configured to switch the validity indicator associated with said block of $N_o$ bytes to its active state, and each time a block of $N_o$ bytes of a datum of the block of cleartext data is loaded by the microprocessor from the unencrypted memory, the hardware security module is configured to verify whether the validity indicator associated with said block of $N_o$ bytes is in its active state and, if such is the case, processing, by the microprocessor, of said block of $N_o$ bytes is permitted, and, if such is not the case, processing, by the microprocessor, of said block of $N_o$ bytes is forbidden.

9. A non-transitory computer program product embodied on a computer readable storage medium, comprising binary code able to be executed by a microprocessor for implementation of a method for executing a computer program with an electronic apparatus that includes the microprocessor, an unencrypted memory, an encrypted memory and a hardware security module, wherein, during the execution of the computer program, the transfer of data between the unencrypted memory and the encrypted memory is carried out in entire blocks of a plurality of encrypted and authenticated data, each datum being composed of one or more blocks of No bytes, where No is equal to the lowest number of bytes that can be written, independently of the other bytes of the datum, by the microprocessor when it executes a write instruction of its instruction set architecture, the method comprising:

a) during the transfer of a block of cleartext data from the unencrypted memory to the encrypted memory:

converting the block of cleartext data into a block of encrypted and authenticated data, said conversion comprising:

encrypting the block of cleartext data to obtain a cryptogram of said block of cleartext data, said cryptogram being able to be decrypted solely in its entirety and not datum by datum, computing an authentication code using the data of the block of cleartext data or using the cryptogram of said block of cleartext data, and grouping, in the same block, the obtained cryptogram, the computed authentication code and metadata to obtain the block of encrypted and authenticated data, then storing the obtained block of encrypted and authenticated data in the encrypted memory, b) during the transfer of a block of encrypted and authenticated data from the encrypted memory to the unencrypted memory:

verifying the integrity of the block of cleartext data or of the cryptogram of the block of cleartext data using the authentication code contained in said block of encrypted and authenticated data, when said verification fails, inhibiting processing, by the microprocessor, of the data of said block of data, and when said verification succeeds:

decrypting the cryptogram contained in the block of encrypted and authenticated data to obtain the block of cleartext data, storing the obtained block of cleartext data in the unencrypted memory and storing the metadata of the block of encrypted and authenticated data in a register that is not addressable by the microprocessor, wherein the method comprises:

incorporating, into the metadata of each block of data and for each block of No bytes of each datum of said block of data, a validity indicator associated with said block of No bytes, said validity indicator being switchable between:

an active state, in which said validity indicator indicates that said block of bytes is valid, and an inactive state, in which said validity indicator indicates that said block of bytes is invalid, at least certain of the validity indicators initially being in their inactive state, for blocks of No bytes of a datum of said block of data that are set to the inactive state when stored in the encrypted memory, when the microprocessor writes a block of No bytes of a datum of the block of cleartext data stored in the unencrypted memory, the security module switches the validity indicator associated with said block of No bytes to its active state, each time a block of No bytes of a datum of the block of cleartext data is loaded by the microprocessor from the unencrypted memory, the hardware security module verifies whether the validity indicator associated with said block of No bytes is in its active state and, if such is the case, processing, by the microprocessor, of said block of No bytes is permitted, and, if such is not the case, processing, by the microprocessor, of said block of No bytes is forbidden, wherein the binary code comprises blocks of the encrypted and authenticated data, the authentication code computed using the data of the block of cleartext data or using the cryptogram of the block of cleartext data, and the metadata.

* * * * *